(12) United States Patent
Nielsen

(10) Patent No.: US 6,665,842 B2
(45) Date of Patent: *Dec. 16, 2003

(54) ADAPTIVE FONT SIZES FOR NETWORK BROWSING

(75) Inventor: Jakob Nielsen, Atherton, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/791,776

(22) Filed: Feb. 26, 2001

(65) Prior Publication Data

US 2002/0010723 A1 Jan. 24, 2002

Related U.S. Application Data

(63) Continuation of application No. 08/880,532, filed on Jun. 23, 1997, now Pat. No. 6,278,465.

(51) Int. Cl.[7] .............................................. G06F 17/00
(52) U.S. Cl. ...................... 715/542; 715/529; 345/471; 345/789
(58) Field of Search .................................. 707/542, 529; 345/471, 860, 789

(56) References Cited

U.S. PATENT DOCUMENTS

4,962,475 A * 10/1990 Hernandez et al. ......... 707/515
5,220,674 A    6/1993 Morgan et al.

(List continued on next page.)

FOREIGN PATENT DOCUMENTS

JP        8-212258    *  8/1996    .......... G06F/17/60

OTHER PUBLICATIONS

Microsoft Corporation, Microsoft Word User's Guide Version 6.0 (Microsoft Press: 1994), Chapters 6, 9, 10, and Appendix B.*
Que Corporation, "Special Edition Using Netscape 2", pp. 118–119, Dec. 1995.*
Cooney, M. "IBM Agents are Secret No More." Network World vol. 14 No. 2: pp. 1(2)(reprinted), Jan. 1997.*
Oliver et al., Netscape 2 Unleashed, Sams Net, pp. 763 and 33.
Nadel et al., "Microsoft Takes the Offensive in the Browser Battle with Netscape," PC Magazine, pp. 39.

Primary Examiner—Heather R. Herndon
Assistant Examiner—Charles A. Bieneman
(74) Attorney, Agent, or Firm—Finnegan, Henderson, Garrett & Dunner, L.L.P.

(57) ABSTRACT

When retrieving documents over a network, such as the Internet, the font size imposed by default or by a style sheet is sometimes not the right size for comfortable viewing by a user. A database of font size changes made by a user to particular documents is maintained and used to infer a font size preference for a document. A document is displayed using a recorded preference. If no preference is found for a document, a check is made to determine if a preference has been specified for a different document related to that document by having a common portion of a network address. That is, if a preference had been specified for one chapter of a document having a particular network address, a preference would be inferred for other chapters of the document based on a common portion of a hierarchical address.

9 Claims, 13 Drawing Sheets

| URL | FONT SIZE | DATE & TIME CHANGED |
|---|---|---|
| www.nasa.gov | 12 | 4/10/97 |
| www.nasa.gov | 10 | 4/11/97 |
| www.gmu.edu/catalog/page 1 | 11 | 5/10/97 |
| – | – | – |
| – | – | – |

302 — URL
303 — FONT SIZE
304 — DATE & TIME CHANGED

U.S. PATENT DOCUMENTS

| | | | |
|---|---|---|---|
| 5,513,342 A | * 4/1996 | Leong et al. | 345/798 |
| 5,544,288 A | * 8/1996 | Morgan et al. | 345/467 |
| 5,566,289 A | * 10/1996 | Ikeo et al. | 707/526 |
| 5,613,090 A | 3/1997 | Willems | |
| 5,630,159 A | * 5/1997 | Zancho | 235/375 |
| 5,640,579 A | * 6/1997 | Koppolu et al. | 707/526 |
| 5,682,550 A | * 10/1997 | Brown et al. | 713/321 |
| 5,737,599 A | * 4/1998 | Rowe et al. | 707/526 |
| 5,760,770 A | * 6/1998 | Bliss et al. | 345/745 |
| 5,796,952 A | * 8/1998 | Davis et al. | 709/224 |
| 5,860,074 A | 1/1999 | Rowe et al. | |
| 5,873,109 A | * 2/1999 | High | 707/507 |
| 5,893,915 A | * 4/1999 | Cordell et al. | 707/542 |
| 5,956,031 A | * 9/1999 | Berteig et al. | 345/420 |
| 5,991,735 A | * 11/1999 | Gerace | 705/10 |
| 6,026,417 A | * 2/2000 | Ross et al. | 707/530 |
| 6,026,433 A | 2/2000 | D'Arlach et al. | |
| 6,031,989 A | * 2/2000 | Cordell | 707/515 |
| 6,088,717 A | * 7/2000 | Reed et al. | 707/204 |
| 6,101,512 A | * 8/2000 | DeRose et al. | 707/529 |
| 6,168,079 B1 | * 1/2001 | Becker et al. | 235/383 |
| 6,199,082 B1 | * 3/2001 | Ferrel et al. | 707/522 |
| 6,393,441 B1 | * 5/2002 | Kanerva et al. | 707/514 |
| 6,393,469 B1 | * 5/2002 | Dozier et al. | 707/501.1 |

* cited by examiner

ADAPTIVE FONT SIZES FOR NETWORK BROWSING

This application is a Continuation of application Ser. No. 08/880,532 filed Jun. 23, 1997 now U.S. Pat. No. 6,278,465.

BACKGROUND OF THE INVENTION

1. Field of the Invention

The invention relates to information retrieval, and more particularly to adaptively changing the font size with which information retrieved over a network is displayed.

2. Description of Related Art

Typically, text contained within documents made available to users of Networks such as the World Wide Web (WWW) is rendered on the user's screen using a font size that is explicitly embedded in a document or a corresponding style sheet. This results in cases where the text displayed may be too large or small for a particular user with a specific screen size. The developers of browsers are aware of this fact and have provided mechanisms that allow the user to increase or decrease the size of the font, either by clicking a button (often repeatedly), to change the font size in a relative manner, or by enabling the user to enter a specific font size. While these solutions may be satisfactory for viewing a single WWW page or group of pages, they require the user to repeatedly change the font size during a web-surfing session where many different pages having many different font sizes are displayed. Thus, these solutions are primitive in that the user interface is not adapting to the individual user's preferences or requirements.

Adaptive User Interfaces (UIs) are known. Many word processing, spreadsheet and drawing programs (e.g., Microsoft Word) "remember" the last X number of files opened and present them in most-recent-first fashion on the File menu of the application. This enables the user to quickly access the document desired without having to use the more complicated and time-consuming Open File dialog box.

Storing font size preferences within a document is known. Additionally, some products are engineered in such a way that they can recall the user's last display size preference. The user can set a value to indicate what percent of the printable size should be displayed. After exiting the program and then re-opening the document the display size selected earlier is retained. For example, if the user decides to view a document at 150% of its printable size, then closes the document, exits the program and later re-opens the document it will display, by default, at 150%.

The Problems

The prior art is limited to those files stored and controlled locally by the user. In a network environment such as the World Wide Web environment the user has no control over document formatting at its source, typically a WWW server. Thus the prior art does not provide a way for adapting font size in a browser or other User Interface based on user font-size preferences for retrieved documents.

The prior art also fails to accommodate the needs of a variety of network users who have different individual preferences for viewing documents, the source copy of which must be shared with other users. The prior art also fails to account for display differences which may cause the same document to appear differently on different displays.

SUMMARY OF THE INVENTION

The present system provides apparatus, systems, methods and computer program products which allow for an adaptive User Interface within a network browser that will utilize information gathered over time to display retrieved pages with font sizes that are desired by the user, even if that user has not visited a particular page before.

As the user encounters web pages that are not in a suitable font size for comfortable viewing, he can change that font size using the prior art. However, in accordance with one aspect of the invention, a browser or other user interface is enhanced to record font size changes in a database and after a certain number of changes to the same font size for a particular page are recorded, the user is asked if this is the preferred font size. If the user indicates that it is the preferred font size, that information is stored in a second database and the desired font size will be automatically used the next time that page is accessed.

Additionally, in accordance with another aspect of the invention, an enhanced browser or other user interface is able to infer from previous font size preference settings made by the user, the appropriate font size to use when accessing a related page for the first time. The adaptive nature of this aspect of the invention is accomplished by utilizing a third database that tracks the user's preferences and attempts to generalize that information, based on the hierarchical structure of WWW sites, so that user preferences can be applied to sub-sites within the site or even to the entire site without any affirmative action on the part of the user.

One aspect of the invention relates to apparatus for displaying information retrieved over a network. The apparatus includes a network interface and a computer connected to the network interface in which the computer stores information about document specific font size preferences for a user and displays documents retrieved over the network interface in a font size determined by that information.

Another aspect of the invention relates to a system for retrieving and displaying information using a network. At least one server is connected to the network. A computer, connected to the network, is configured for retrieving information from one or more servers, determining font size preferences based on at least one user's history of font size changes and displaying the information in accordance with the font size preferences.

Another aspect of the invention relates to a method of determining font size preferences for display of documents by storing information about each font size change and a document to which it relates; and determining font size preference for documents based on that information.

Another aspect of the invention relates to a method of displaying a document, by checking a database of size preferences to see if a size preference is stored for the document. If a size preference is not found for the document, a check is made of a database for a size preference for a different document which shares a common portion of a network address with the first document. The document is then displayed with a size preference found in one of the databases.

The foregoing and other features, aspects and advantages of the present invention will become more apparent from the following detailed description of the present invention when taken in conjunction with the accompanying drawings.

BRIEF DESCRIPTION OF THE DRAWINGS

The objects, features and advantages of the system of the present invention will be apparent from the following description in which.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
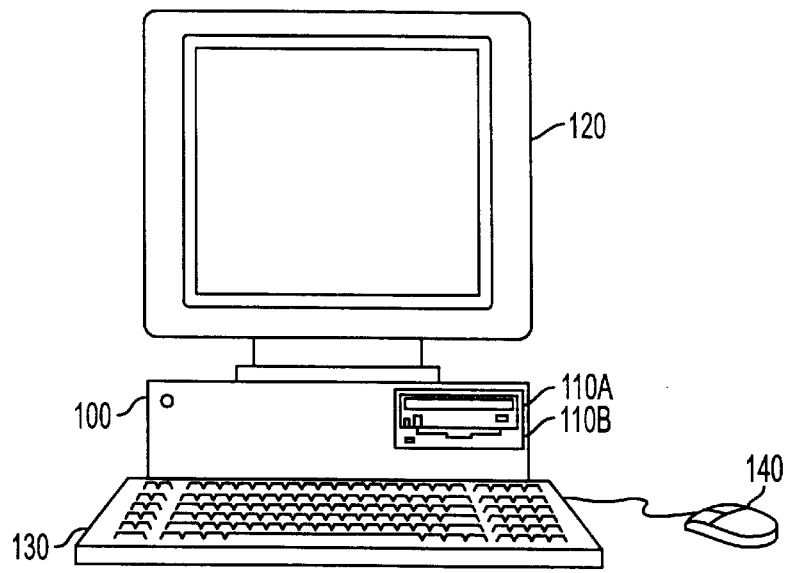
FIG. 1A illustrates a computer of a type suitable for carrying out the invention.

FIG. 1A illustrates a computer of a type suitable for use as a user device or server when carrying out the invention. Viewed externally in FIG. 1A, a computer system has a central processing unit 100 having disk drives 110A and 110B. Disk drive indications 110A and 110B are merely symbolic of a number of disk drives which might be accommodated by the computer system. Typically, these would include a floppy disk drive such as 110A, a hard disk drive (not shown externally) and a CD ROM drive indicated by slot 110B. The number and type of drives varies, typically, with different computer configurations. The computer has the display 120 upon which information is displayed. A keyboard 130 and a mouse 140 are typically also available as input devices. Preferably, the computer illustrated in FIG. 1A is a SPARC workstation from Sun Microsystems, Inc.

Figure 1B:
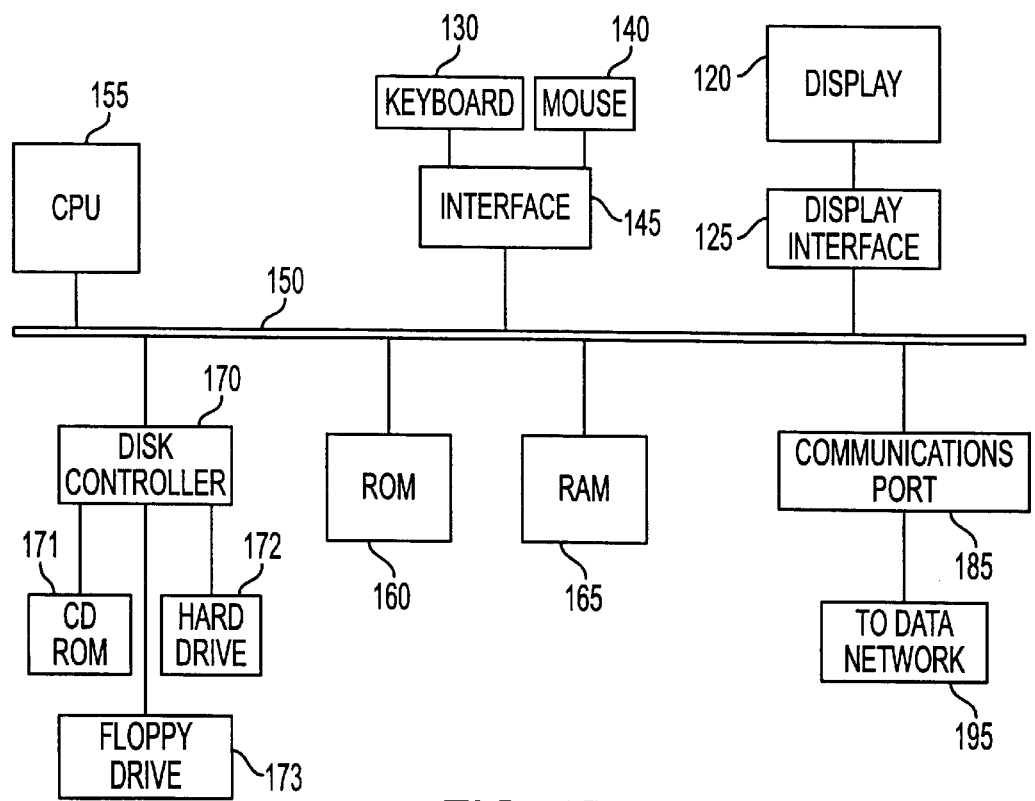
FIG. 1B illustrates a block diagram of the computer of FIG. 1A.

FIG. 1B illustrates a block diagram of the internal hardware of the computer of FIG. 1A. A bus 150 server as the main information highway interconnecting the other components of the computer. CPU 155 is the central processing unit of the system, performing calculations and logic operations required to execute programs. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces a display 120 and permits information from the bus to be viewed on the display. Communications with external devices can occur over communications port 185.

Figure 1C:
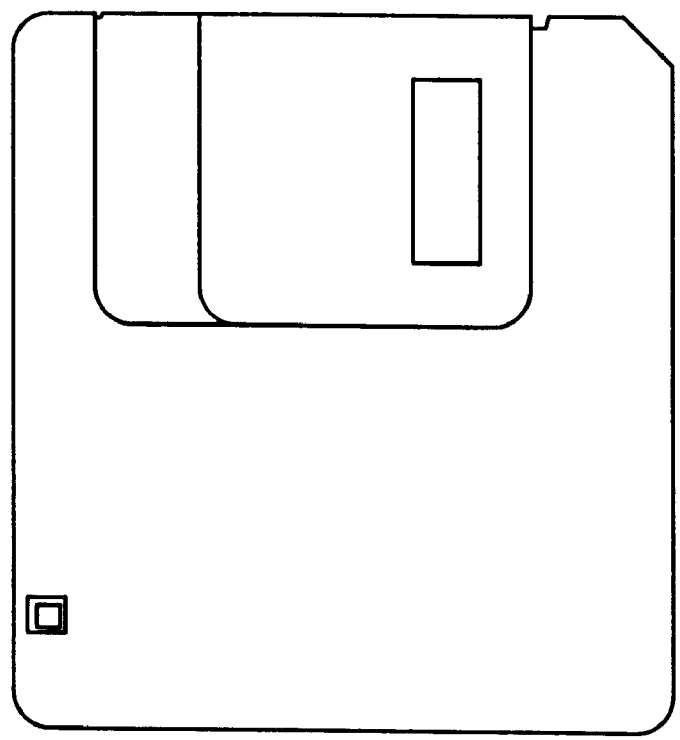
FIG. 1C illustrates an exemplary memory medium containing on or more programs usable with the computer of FIG. 1A.

FIG. 1C illustrates an exemplary memory medium which can be used with drives such as 173 in FIG. 1B or 110A in FIG. 1A. Typically, memory media such as a floppy disk, CD ROM, or Digital Video Disk will contain the programs and data for controlling the computer to enable the computer to performs its functions in accordance with the invention.

Figure 2:
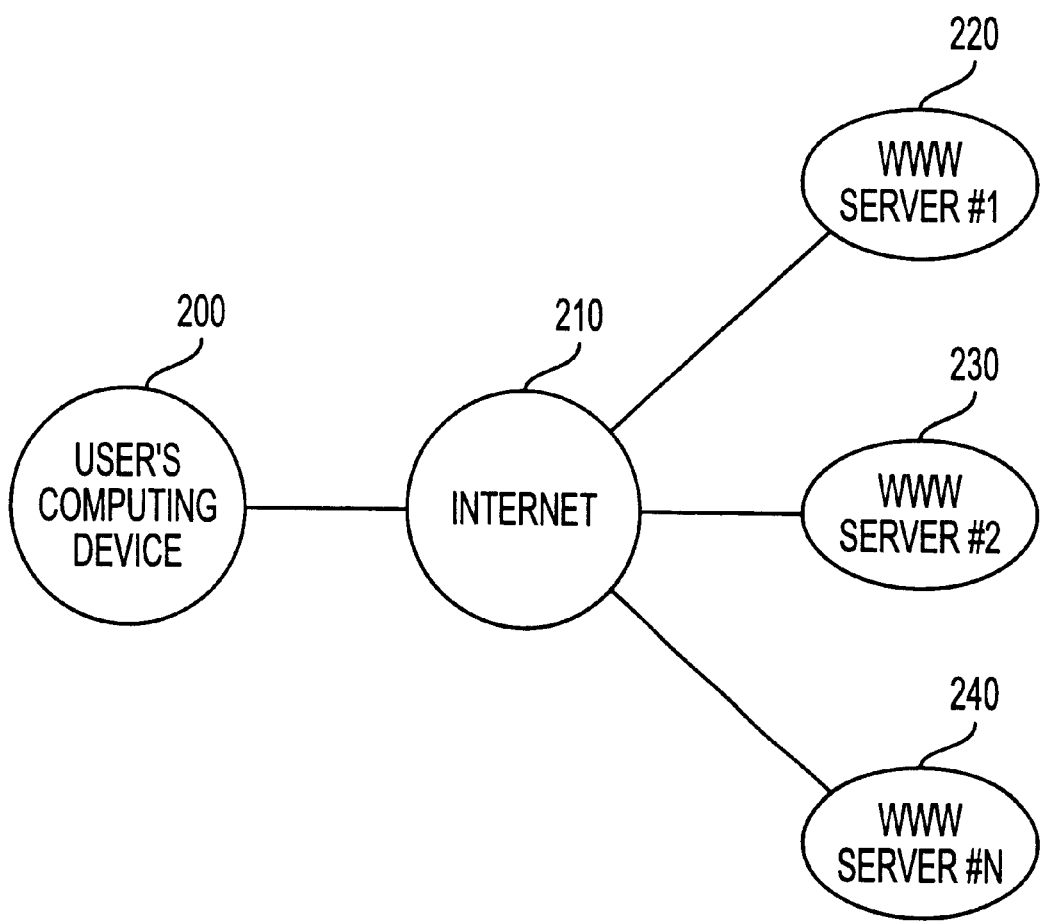
FIG. 2 illustrates the environment in which the invention will operate.

FIG. 2 illustrates a network environment in which aspects of the invention will typically operate. The user's computing device 200 is connected to a network such as the Internet 210 and can access various servers 220, 230 and 250.

Figure 3A:
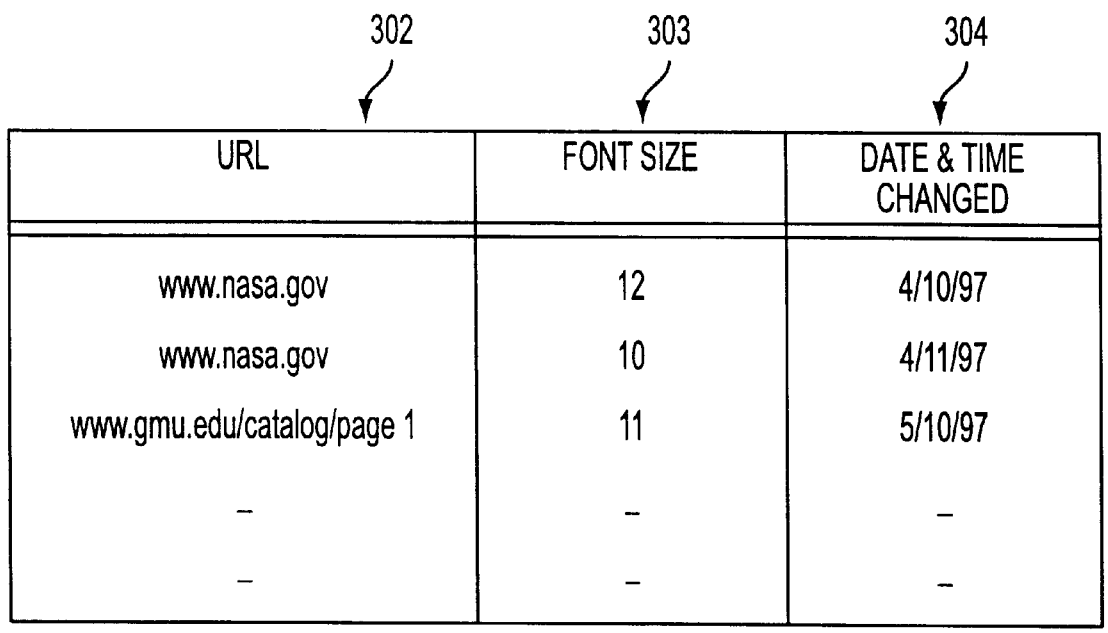
FIG. 3A is a database organized as an exemplary way to store font size change information.

FIG. 3A is a database organized to store a limited history of font size change information. The URL 302, Font Size 304 and the Date and Time Changed 306 are stored each time the user has made a final font size change for a particular page. This information is recorded when the user attempts to exit the page via the BACK button on a browser or by following a hypertext link. By waiting until the user is about to exit, any previous font size change activity can be ignored by assuming that any previous font size changes were not preferred by the user. The font size change database only stores the two most recent font changes for a given URL. When a new record is added to the database, a check is made to see if two records already exist for that URL. If so, the oldest one is deleted.

Figure 3B:
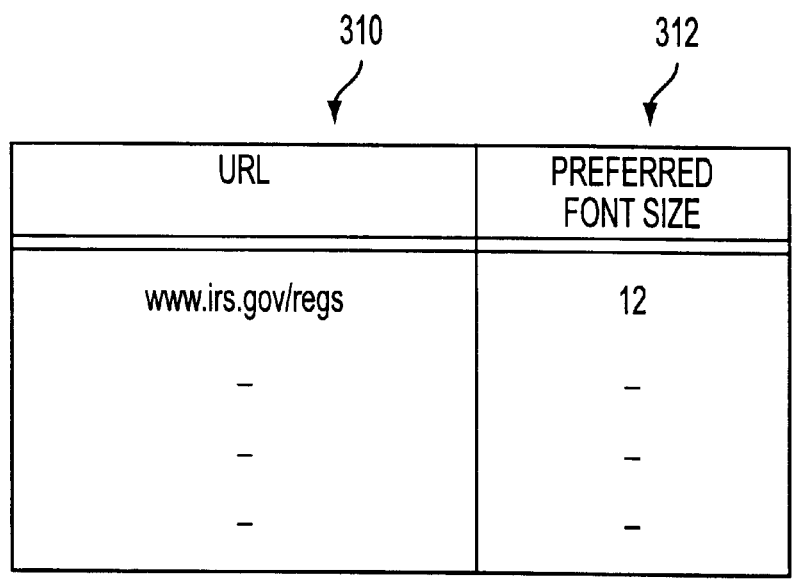
FIG. 3B is a database organized as an exemplary way to store font size preference information.

FIG. 3B is an exemplary database organized to store information. This database contains records having a network address or URL 310 and the Preferred Font Size 312 which the user has indicated should be applied during future URL accesses, as described more hereinafter. Font size preference information is either explicitly indicated by the user or inferred using the database of FIG. 3A.

Figure 3C:
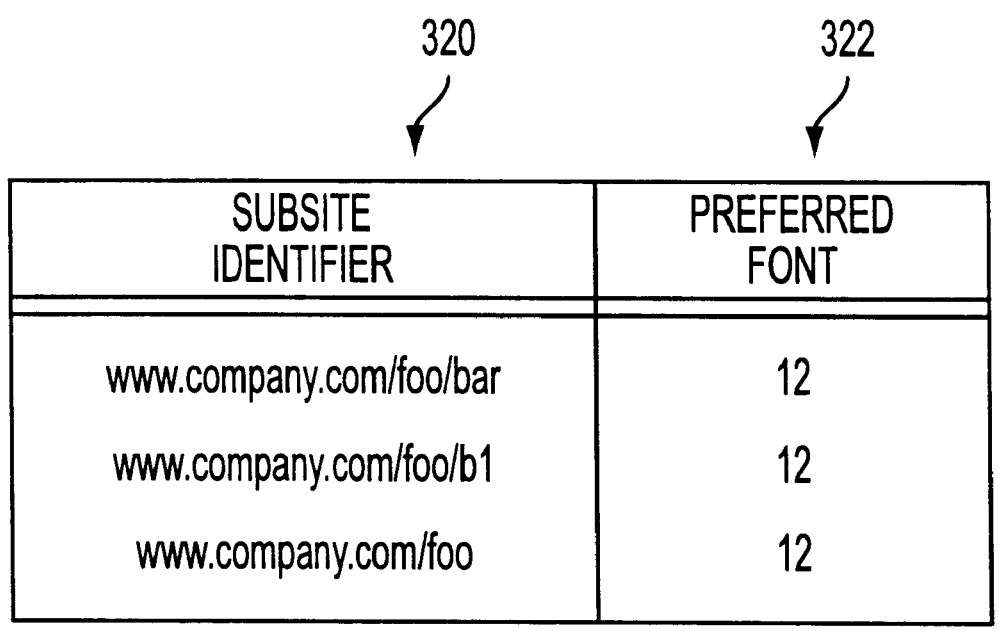
FIG. 3C is a database organized as an exemplary way to store font size preferences for network sites and sub-sites.

FIG. 3C is an exemplary database organized to store font size preferences for network sites and sub-sites. This database contains a site or sub-site identifier 320 and the Preferred Font Size 322. A site or sub-site identifier is a URL that does not end with a filename, but with a directory name. The sub-site identifier may be the parent of other sub-sites or a sibling of other sites or sub-sites or both.

Figure 4:
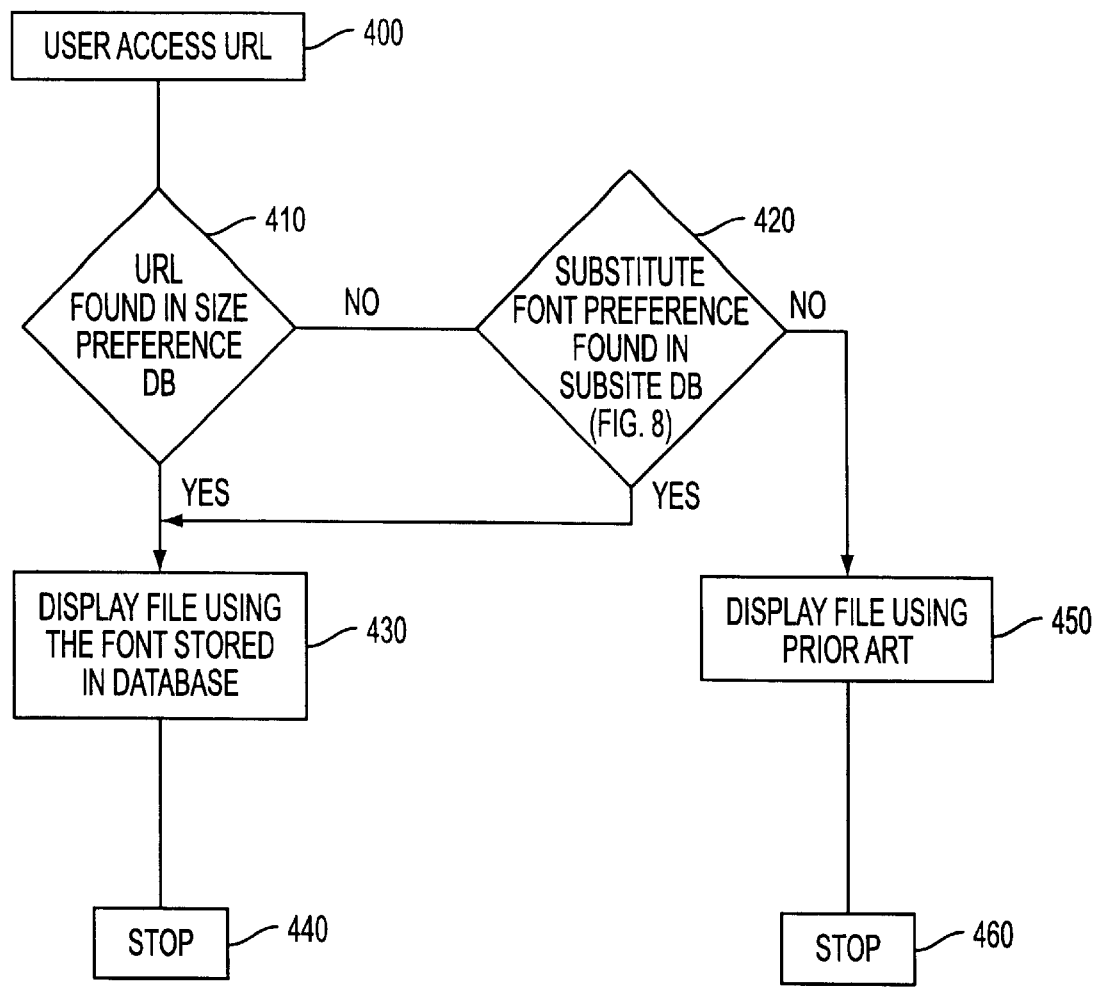
FIG. 4 is a flowchart of a process for utilizing an adaptive browser or User Interface in accordance with the invention.

FIG. 4 is a flowchart of a process for utilizing the adaptive User Interface of the present invention. When the user accesses a URL 400 the Size Preference Database (FIG. 3B) is queried. If the URL was found in the Size Preference Database 410 then the requested document is displayed using the preferred font size retrieved from the database 430 and the process is terminated 440. If the URL was not found in the Size Preference Database 410 then a search (see FIG. 8) is made of the Sub-Site Database entries to see if a font preference exists for the sub-site that contains the requested page 420. If a sub-site preference is found then the requested page is displayed using the preferred font size 430 and the process is terminated 460. If no sub-site preference was found 420 then the requested page is displayed as done in the prior art (450) and the process is terminated 460.

As illustrated in FIG. 3A, a user's web browser, enhanced with the functionality discussed herein, maintains a database of URLs for which the user has changed the font size. Changing a font size, for purposes of the implementation, while a page is displayed in the topmost window of the browser, includes activating the command to change the font size without simultaneously changing the font name. If the user changed the font name and font size in a single operation, then this is not counted as a font size change. If the user changes the font size by repeatedly activating a "font larger" and/or "font smaller" command (e.g., by clicking a toolbar button like that found in Microsoft Internet Explorer), then only the last font size chosen is considered as a font size change. The intermediate fonts sizes are not recorded.

Figure 5A:
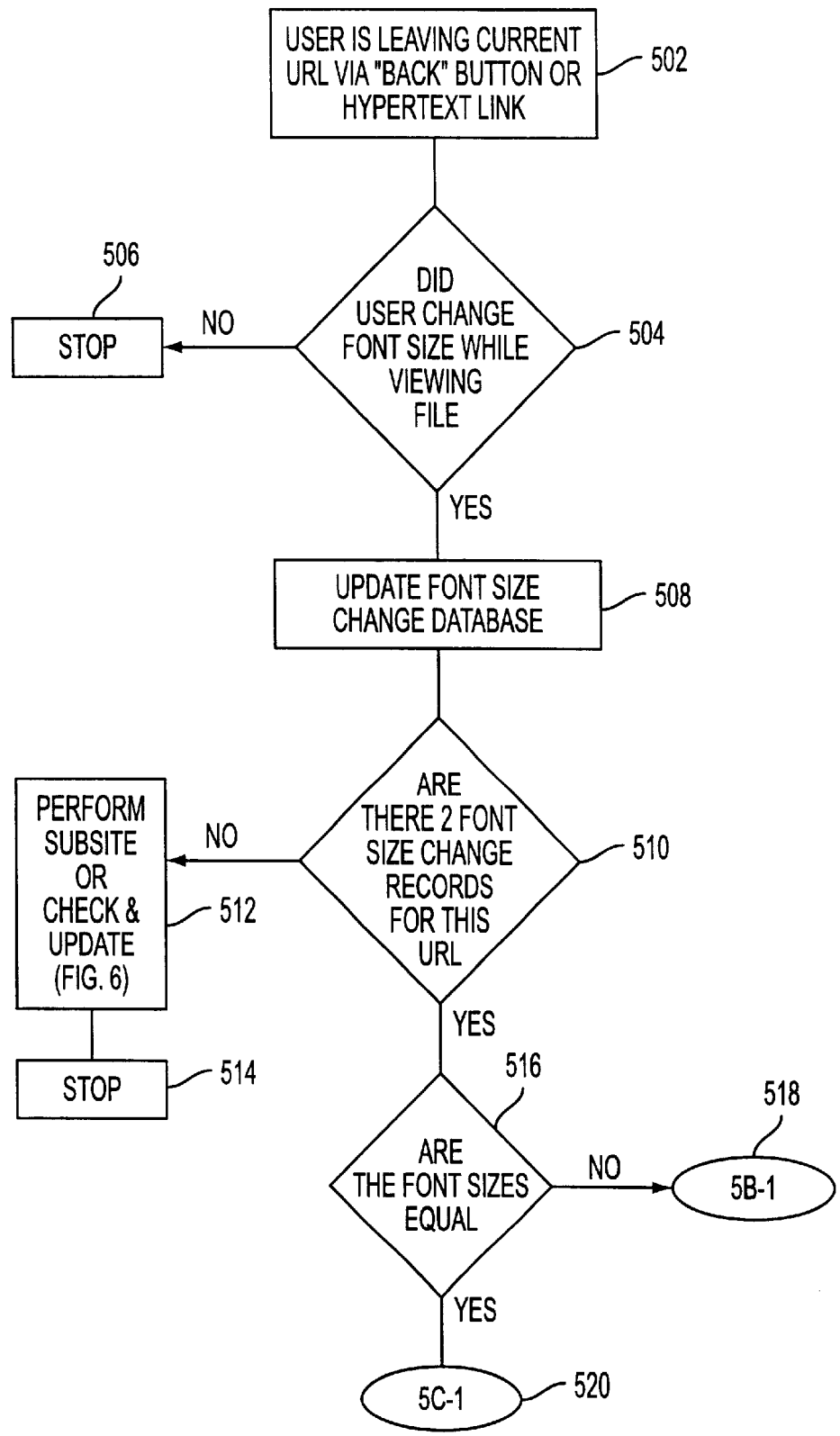
FIGS. 5A, 5B and 5C is a flowchart of a process for gathering font size changes, preferences and sub-site information to be stored in the databases of FIG. 3A–3C.

In FIG. 5A, when a new font change record has been added to the Font Size Change Database of FIG. 3A, the browser checks whether the database also has an older record for that URL. If not, processing continues with the "sub site" step discussed below. If yes, the enhanced browser checks whether the two records have the same font size. If no, it is assumed that the user does not have a specific font size preference for this URL and processing continues with the "no preference" step described below.

If there are two records for this URL in the Font Size Change Database, then the enhanced browser checks whether a record for this URL exists in the Font Preference Database (542). If yes, (see FIG. 5C) then if the current font size is the same as the size stored as the preferred font size (544), no further processing is done. If the enhanced browser does not have a font preference record for this URL or the sizes are different, it presents a dialog box (548) asking: "Do you want the page displayed with the current font size from now on?" Two buttons are provided: "Yes, always use this size" and "No, do not remember this font size". If the user chooses "No", no further processing is done (542). If the user chooses "Yes" then the URL and preferred size are added to the Font Size Preference Database (554) as a new record if no record exists for this URL or as a change to the existing record if one does exist. Processing then continues with the "sub site" step described below.

Figure 5B:
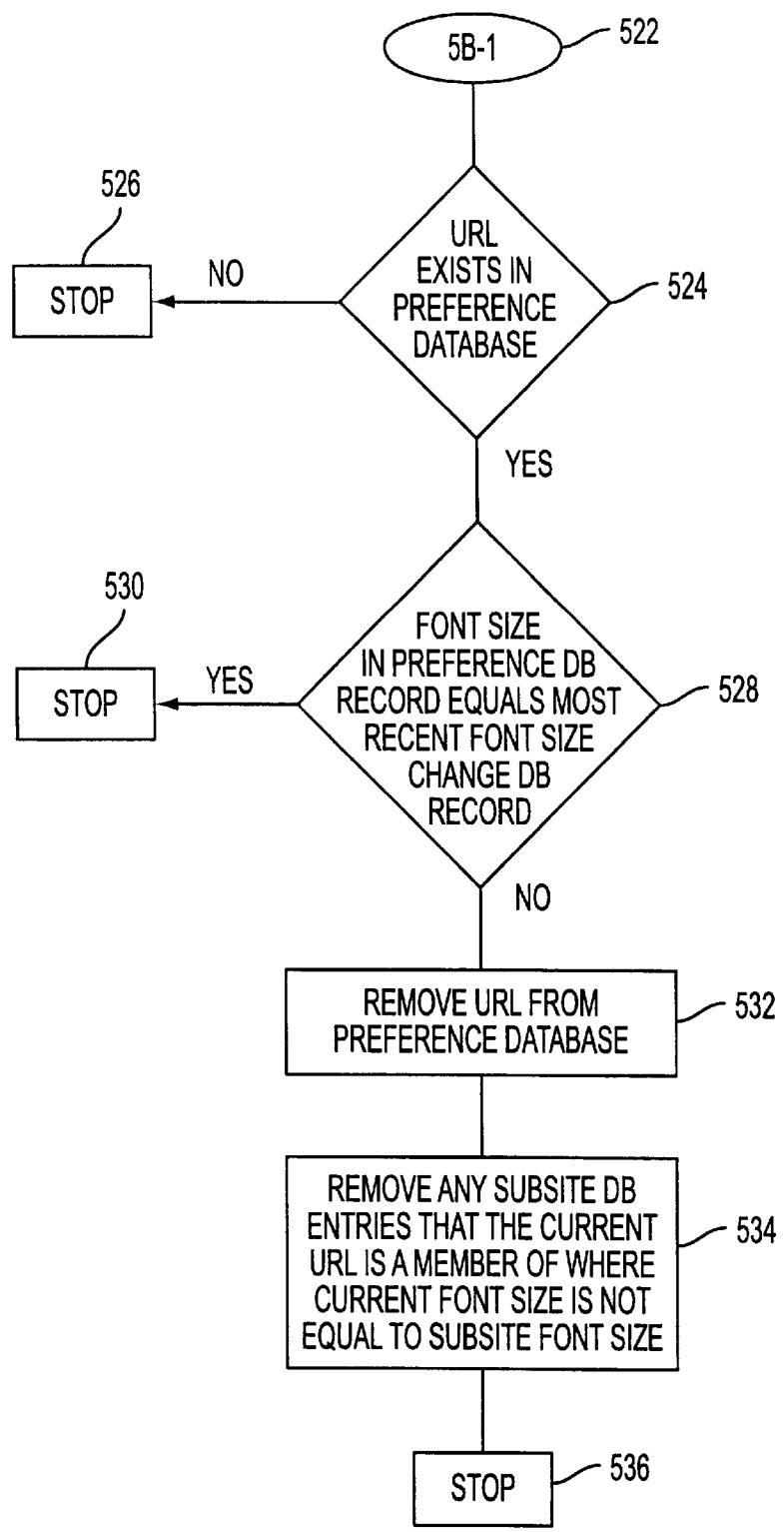

In FIG. 5B, the "no preference" step (518 of FIG. 5A) operates in the following manner: The enhanced browser checks the Font Size Preference Database for a record for the current URL. If such a record exists (524-Y) and if the font size in the record is different from that now chosen by the user (528-N), the record is deleted from the Font Size Preference Database (532), the assumption being that the user has changed his or her preference for the page. Furthermore, if one or more sub-site records were found in the Sub-Site Database for which the current page is a member of the sub-site, then those records for which the font size field in that record is different from the one new size chosen by the user are removed from the Sub-Site Database (534).

"Sub-site" processing operates generally in the following manner: The user should not be required to manually specify the preferred font sizes for all pages within a given sub-site. To avoid this, an enhanced browser collects all records from the Font Size Change Database and the Font Size Preference Database in which the URL field specifies a page within the same sub-site as the current URL. The definition of whether a two pages belong to the same sub-site will depend upon whether a sitemap technology is available to explicitly specify the structure of the site. If available, the sitemap definition is used to determine what other pages belong to the same sub-site as the current page. If not available, two pages are assumed to belong to the same sub-site if they share common components in the path in the URL, excluding a final portion. For example, for the URL http://www.company.com/foo/bar/file.html the path shared with other URLs in the same sub-site is http://www.company.com/foo/bar. See the discussion of FIG. 9, hereinafter.

Figure 6:
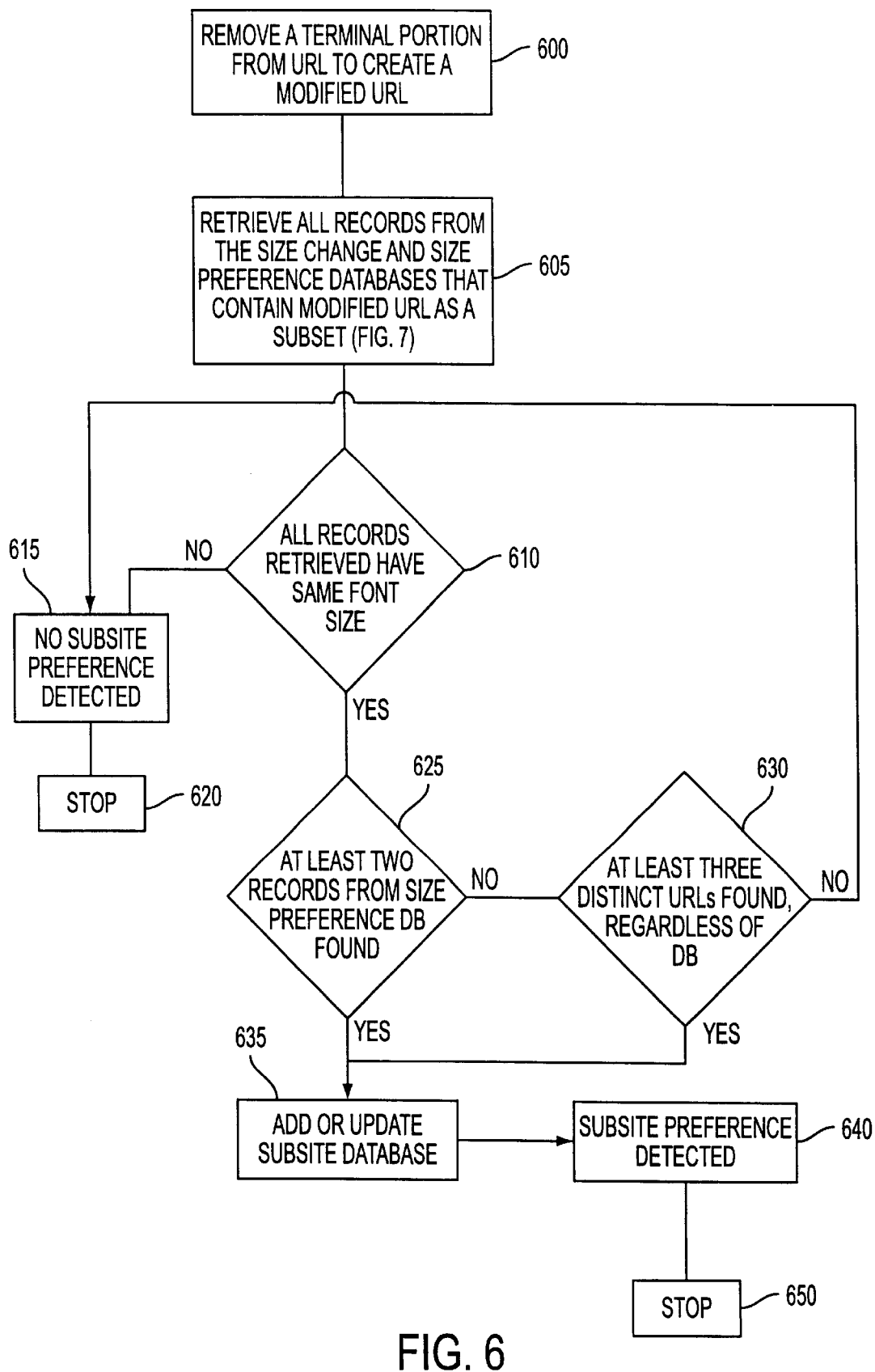
FIG. 6 is a flowchart of a process for determining if a sub-site font size preference can be inferred.

As shown in FIG. 6, a sub-site preference is detected when the following conditions all hold true: a) all the records that were found (from either the Font Size Change Database or the Font Size Preference Database) specify the same font size and b) at least two records were found in the Font Size Preference Database or records for at least three different URLs within the sub-site were found (from either database). When a sub-site preference has been detected, the browser adds a record to the Sub-Site Database for the new preference, or if a record already exists for the sub-site it is updated with the new font size preference. If a sitemap technology is available to explicitly specify the structure of the site, then the sub-site identifier is in the notation of the sitemap technology. Otherwise the sub-site identifier is the URL path that specifies the sub-site. In the previous example, the sub-site identifier would be:

http://www.company.com/foo/bar

By implication, nested sub-sites can be recursively accommodated. For example, two higher-lever sub-sites from the given example would be:

http://www.company.com/foo/ http://www.company.com/ which also indicates that and entire site can be considered to be a high-level sub-site.

Figure 7:
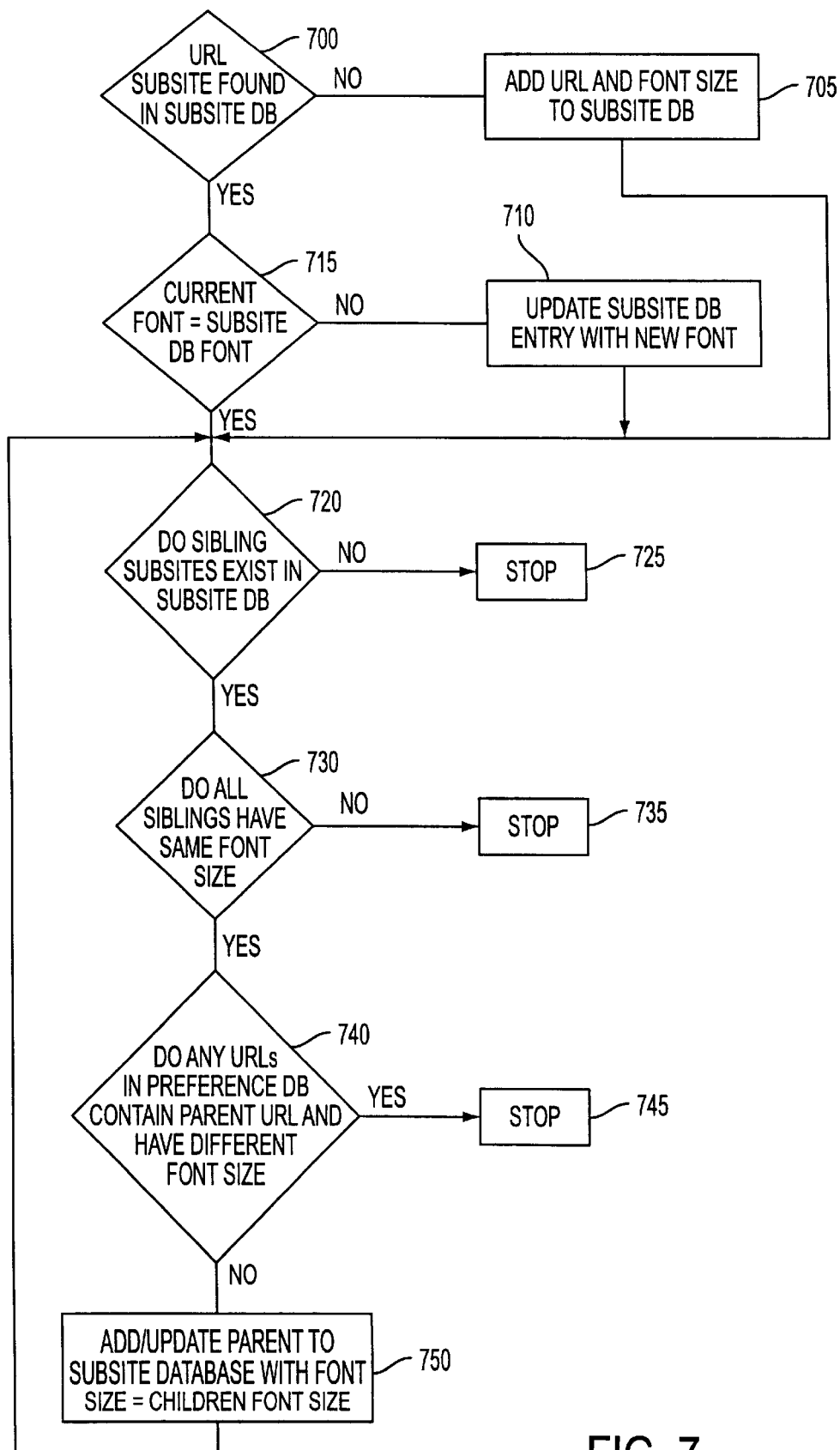
FIG. 7 is a flowchart of a process for updating the sub-site database with font size preference information.
Figure 8:
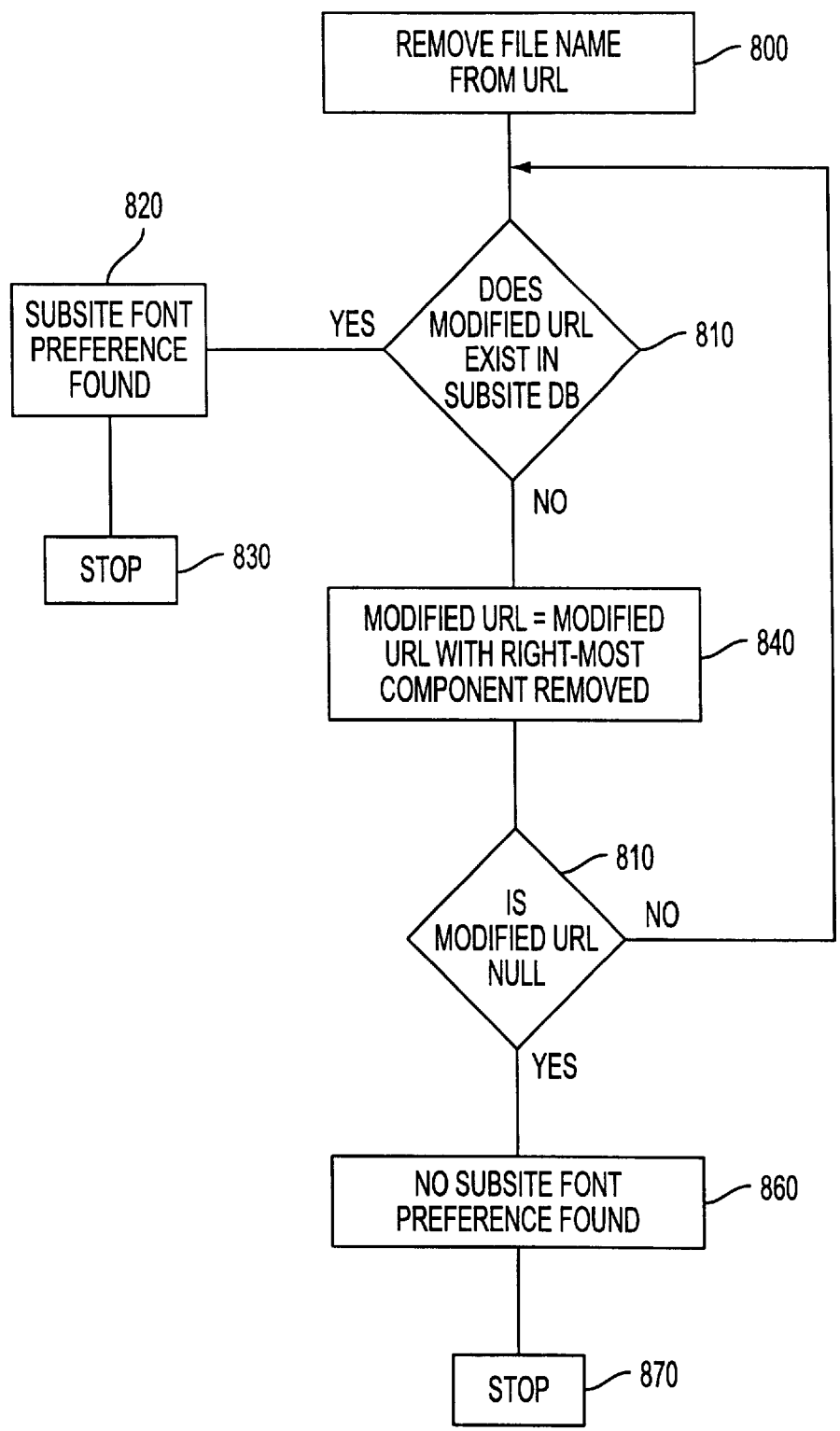
FIG. 8 is a flowchart of a process for recursive processing of a sub-site to detect if any font size preference is available in the sub-site database.

To accommodate nested sub-sites, the "sub-site" processing described above is extended with the following actions: As shown in FIG. 7, the enhanced browser checks the Sub-Site Database for any sub-sites that are siblings to the sub-site immediate containing the URL. If any such sub-sites are found, then a candidate for a higher-level sub-site is identified in the form of the parent sub-site to these sibling sub-sites. If all of the sibling sub-sites have the same font size preference and if it is the same as the font size preference of the current URL and if no URLs are found in the Font Size Preference Database that are members of the parent sub-site and have a different font size preference, then the parent sub-site is considered to have a valid font size preference. It is added to the sub-site database, or if a record already exists for the parent sub-site the record is updated with the new font size preference. If a parent sub-site was found with a valid size preference then this procedure is recursively repeated, as shown in FIG. 8, at higher levels of sub-site until no further high-level sub-site has been found to have a valid size preference.

Figure 5C:
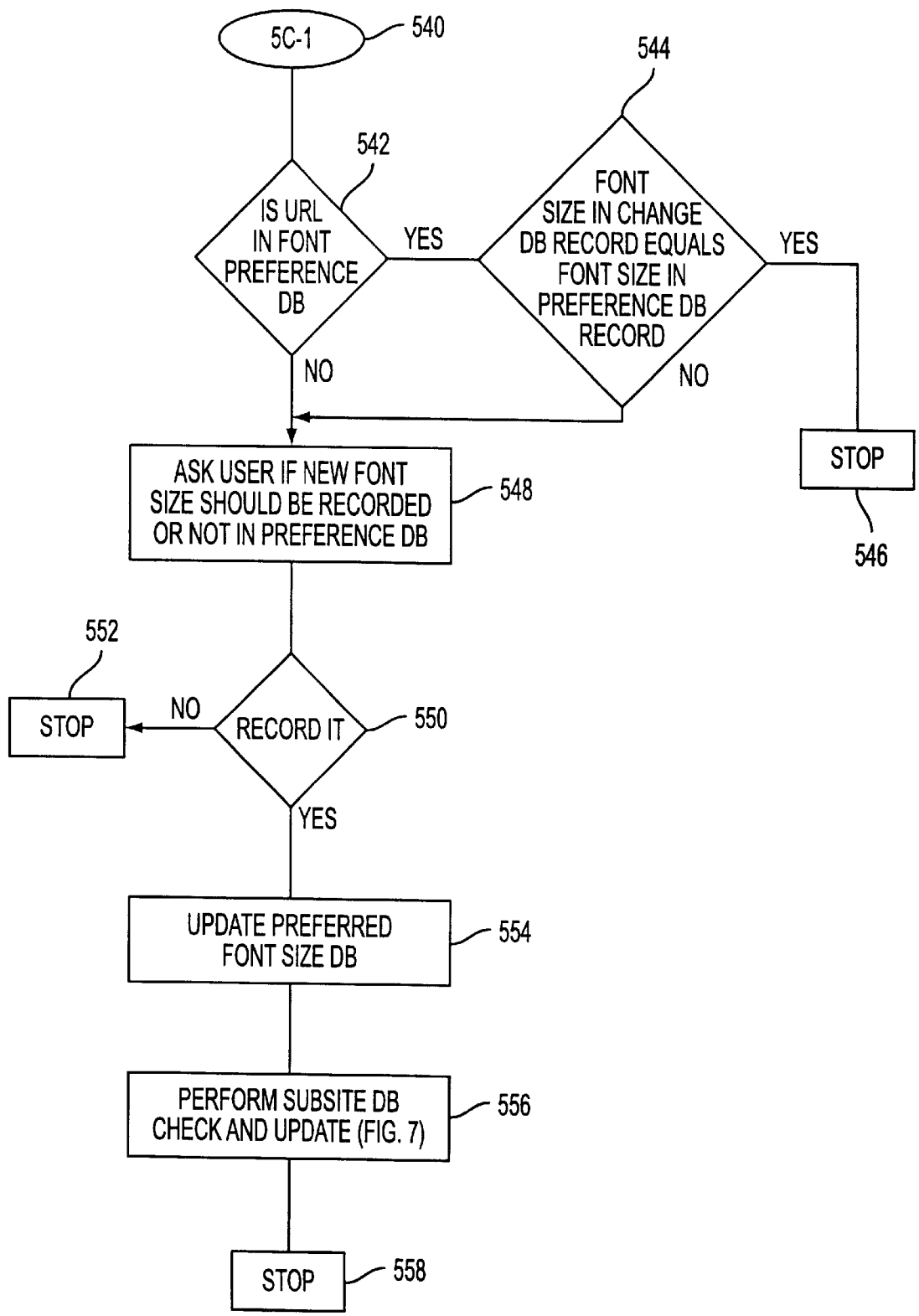

Considering these processes more in detail, FIGS. 5A, 5B and 5C are flowcharts of a process for gathering font size changes, preferences and sub-site information to be stored in the databases of FIGS. 3A–3C. The process begins in FIG. 5A when the user is about to leave the current URL using the "BACK" button of his browser of by following a hypertext link 502. If the user did not change the font size of this URL 504 then the process is terminated 506. If the user did change the font size of this URL 504 then the Font Size Change Database is updated 508. If there is only one Font Size Change Database record for this URL 510 then a sub-site search (FIG. 6) is invoked 512 and the process is terminated. If there were two records in the Font Size Change Database for this URL 510 and those two records have the same font size then the process branches 520 to FIG. 5C at entry point 5C-1 to determine if the font size should be stored in the Font Size Preference Database. If the two font sizes are not equal (516) then the process branches (518) to FIG. 5B at entry point 5B-1 where the Font Size Preference Database is potentially updated.

In FIG. 5B at entry point 5B-1 the URL is checked to see if it is in the Font Size Preference Database 524. If it is not then the process is terminated 526. If it is and the font size specified there equals the font size in the most recent record for the URL in the Font Size Change Database 528 then the process is terminated. If it is not equal then the URL is removed from the Font Size Preference Database 532. Then the URL is used to remove any entries from the Sub-Site Database of which it is a member and where the sub-site font size is different from the most recent Font Size Change Database entry for the URL 534 and the process is terminated 536.

In FIG. 5C at entry point 5C-1 the URL is checked to see if it exists in the Font Size Preference Database 542. If the Font Size Change Database record has the same font size as the Font Size Preference Database record 544 then no changes are needed and the process is terminated 546. If they are different 544 or if the URL does not currently exist in the Font Size Preference Database 542 then the user is asked if the current font size should be recorded in the Font Size Preference Database 548. If the user declines to record it 550 then the process is terminated. If the user does wish it recorded 550 then the Preferred Font Size Database is updated with the URL and the current font size 554, the Sub-Site Database is updated (FIG. 7) to reflect the new information 556 and the process is terminated 558.

FIG. 6 is a flowchart of a process for determining if a sub-site font size preference can be inferred. The process begins by removing the file name from the URL 600. Then all records that contain the modified URL in both the Font Size Change Database and the Font Size Preference Database are retrieved 605. If all the records retrieved do not have the same font size 610 then no sub-site preference can be inferred 615 and the process is terminated 620. If all the records do have the same font size 610 and at least two of those records are from the Font Size Preference Database 625 or at least three distinct URLs are found in the records 630 then a sub-site font size preference is determined to exist 635 and the Sub-Site Database is updated. A flag indicating that a sub-site preference was detected is set 640 and the process is terminated. If there were not two records from the Font Size Preference Database 625 or not three distinct URLs in all the records 630 then no sub-site preference can be inferred 615 and the process is terminated 620.

FIG. 7 is a flowchart of a process for updating the sub-site database with font preference information. The process starts by determining if the URL is a member of a sub-site already recorded in the Sub-Site Database 700. If a sub-site record for the URL is not found then one is created in the Sub-Site Database 705. If a sub-site record for the URL is found 700 then if the current Font Size Change Database record's font size is different from the corresponding Sub-Site Database record's font size 715 the Sub-Site Database is updated with the current font 710. In either case the Sub-Site Database is checked for siblings of the sub-site of which the URL is a member 720. If none exists the process is terminated 725. If siblings do exist 720 but all the siblings do not have the same font size 730 then the process is terminated 735. If they all do have the same font size 730 and no parent sub-site is found in the Font Size Preference Database with a different font size 740 then the parent sub-site entry is made or updated in the Sub-Site Database 750 with the parent's font size set equal to the children's font size. The process is then repeated recursively beginning at 720.

FIG. 8 is a flowchart of a process for recursive processing of a sub-site to detect if any font size preference is available in the Sub-Site database. To begin, the file name is removed from the URL 800. If the modified URL has an entry in the Sub-Site Database 810 then a sub-site font size preference has been found 820 and the process is terminated 830. If the modified URL is not found in the Sub-Site Database 810 then the modified URL is modified further by removing the right-most component (see FIG. 9) from the URL 840. If the modified URL is not null then processing resumes at 810 otherwise no sub-site preference has been found 860 and the process is terminated 870.

Figure 9:
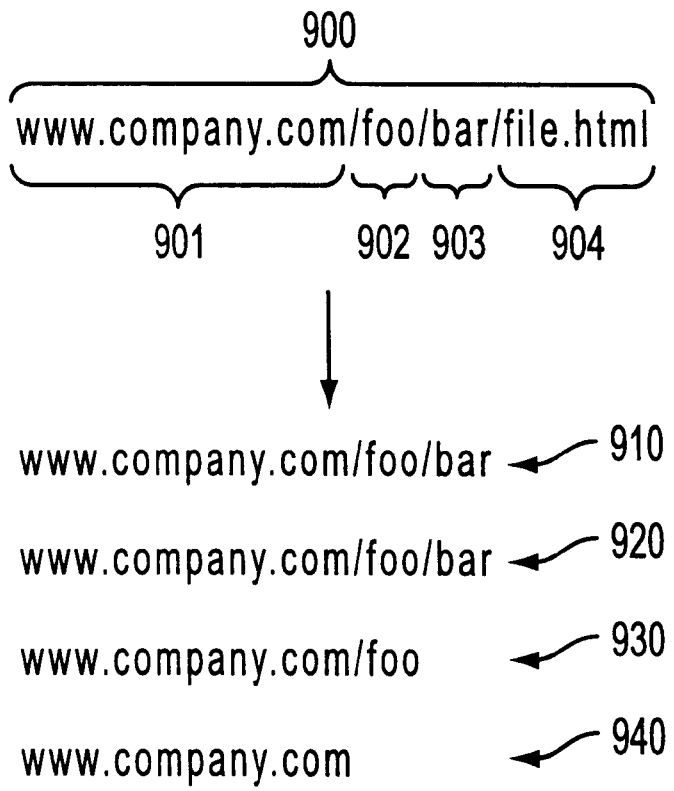
FIG. 9 is an illustration of the structure of a URL and the relationships between parent and siblings.

FIG. 9 is an illustration of the structure of a URL and the relationships between parent and siblings. The URL 900 is constructed of components. In the example shown, the server name 901 is followed by the directory name 902 which, in turn, is followed by another directory name 903. The URL is terminated by the name of the file to be accessed 904. The lowest level sub-site for the URL 900 is given at 910 by removing the file name from the URL. Given another sub-site like 920 it is obvious that they are siblings in that they both reside at the same depth of the same hierarchical directory structure. By extension, 930, constructed by removing the right most component of the modified URL, is the obvious parent of 910 and 920. Similarly, 940 is the parent of 930.

Techniques for adapting font sizes for documents retrieved over a network in accordance with user preferences, either expressed or inferred, have been described above. In this way, the user achieves a more satisfactory experience when retrieving information over a network because information is presented in a way which most closely reflects the user's preferences.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for displaying documents retrieved over a network, comprising:
   a network interface; and
   a computer connected to said network interface, said computer storing information associated with font size preferences for a user of said computer and using the information to display documents retrieved via the network interface in a font size specified for a document or for a class of documents of which said document is a member, said class of documents determined by network address.

2. A method for determining font size preferences for display of documents retrieved over a network comprising the steps of:
   a. storing, in a database coupled to the network, information reflecting at least one font size change associated with a first document;
   b. determining a font size preference for at least a second document via the stored information in response to a user accessing said second document; and
   c. displaying said second document using the font size preference.

3. A method for determining font size preferences comprising the steps of:
   storing information about at least one font size change performed by a user and a document to which said change relates; and
   determining font size preference for related documents based on said information,
   wherein said font size preference is set by presenting the user with an option to store a font size preference when the user performs the at least one font size change.

4. A method for determining font size preferences for display of documents, retrieved over a network, comprising the steps of:
   a. storing, in a database coupled to the network, information about at least one font size change and a first document to which said change relates; and
   b. determining font size preference for a second document retrieved over the network using the information relating to the first document, wherein the first document is associated with the retrieved document via an identifier.

5. A method of displaying a document, comprising the steps of:
   a. checking a database of font size preferences to determine if a size preference is stored for said document;
   b. if a font size preference is not found for said document, checking a database for a font size preference for a different document sharing a common portion of a network address with said document; and
   c. displaying said document with a font size preference found in one of the preceding steps.

6. A computer program product comprising:
   a. a memory medium; and
   b. a computer program stored on said memory medium, said computer program comprising instructions for storing information about at least one font size change and a document to which said change relates and determining font size preference for a retrieved document based on information stored for a class of documents of which the retrieved document is a member, said class being determined by a network address.

7. The computer program product of claim 6 in which said program is transmitted from said memory medium over a network interface.

8. A computer program product comprising:
   a. a memory medium; and
   b. a computer program stored on said memory medium; said computer program comprising instructions for:
   searching a first database to determine whether a font size preference is stored for a first document, and
   when the font size preference is not stored for the first document, searching a second database for a font size preference for a second document associated with the first document and displaying the first document with the font size preference for the second document.

9. The computer program product of claim 8 in which said program is transmitted from said memory medium over a network interface.

* * * * *

UNITED STATES PATENT AND TRADEMARK OFFICE
CERTIFICATE OF CORRECTION

PATENT NO. : 6,665,842 B2  Page 1 of 1
DATED : December 16, 2003
INVENTOR(S) : Jakob Nielsen It is certified that error appears in the above-identified patent and that said Letters Patent is hereby corrected as shown below:

<u>Title page,</u>
Item [74], *Attorney, Agent, or Firm*, "Finnegan, Henderson, Garrett & Dunner, L.L.P." should read -- Finnegan, Henderson, Farabow, Garrett & Dunner, L.L.P. --.

<u>Column 10,</u>
Line 30, "medium," should read -- medium, --.
Line 33, "document, and" should read -- document and, when the size preference is stored, displaying the first document with the size preference, and --.

Signed and Sealed this

Twenty-seventh Day of April, 2004

JON W. DUDAS
*Acting Director of the United States Patent and Trademark Office*